United States Patent [19]

Siegenthaler

[11] Patent Number: 5,394,920

[45] Date of Patent: Mar. 7, 1995

[54] METHOD OF PRODUCING A TOROIDAL ROAD VEHICLE TIRE CARCASS, AND CARCASS PRODUCED THEREBY

[75] Inventor: Karl J. Siegenthaler, Rome-Ostia, Italy

[73] Assignee: Bridgestone Corporation, Tokyo, Japan

[21] Appl. No.: 991,828

[22] Filed: Dec. 16, 1992

[30] Foreign Application Priority Data

Dec. 30, 1991 [IT] Italy ............... TO91A1050

[51] Int. Cl.⁶ .................. B60C 9/10; B29D 30/00
[52] U.S. Cl. .................. 152/563; 156/117; 152/548
[58] Field of Search ............ 156/117, 362 R, 125, 156/397, 326; 152/357, 558, 562, 548, 552, 560, 563; 139/1 R

[56] References Cited

U.S. PATENT DOCUMENTS

| 522,814 | 7/1894 | Welch | 152/548 |
|---|---|---|---|
| 649,720 | 5/1900 | Duryea | 152/548 |
| 670,413 | 3/1901 | Tillinghast | 152/548 |
| 797,138 | 8/1905 | Marshall | 152/548 |
| 1,170,597 | 2/1916 | Archer | 152/548 |
| 1,328,006 | 1/1920 | McLeod | 152/548 |
| 3,815,652 | 6/1974 | Pouilloux | 152/356 |
| 3,935,894 | 2/1976 | Pouilloux | 152/548 |
| 4,108,707 | 8/1978 | Appleby et al. | 156/397 |
| 4,277,295 | 7/1981 | Schmidt et al. | 156/117 |
| 4,830,781 | 5/1989 | Oswald | 152/548 |

FOREIGN PATENT DOCUMENTS

| 489353 | 11/1991 | European Pat. Off. . | |
| 410370 | 12/1909 | France . | |
| 457440 | 7/1912 | France . | |
| 236904 | 7/1945 | Switzerland | 152/548 |
| 393312 | 6/1933 | United Kingdom | 152/548 |

Primary Examiner—Clifford D. Crowder
Assistant Examiner—Larry D. Worrell, Jr.
Attorney, Agent, or Firm—David A. Thomas

[57] ABSTRACT

A toroidal road vehicle tire carcass comprises two annular beads connected by a substantially tubular toroidal reticulated structure defined by a number of elongated reinforcing elements extending between and substantially radially in relation to the beads. The carcass is produced using at least one continuous cord for forming a first and a second continuous series of oppositely-oriented U-shaped loops, wherein the loops in both series are connected so as to weave the substantially tubular reticulated structure enclosing the two beads.

9 Claims, 1 Drawing Sheet

METHOD OF PRODUCING A TOROIDAL ROAD VEHICLE TIRE CARCASS, AND CARCASS PRODUCED THEREBY

BACKGROUND OF THE INVENTION

Technical Field

The present invention relates to a method of producing a toroidal road vehicle tire carcass. In particular, the present invention relates to a straightforward, low-cost method of producing a toroidal radial tire carcass comprising two annular beads connected by a toroidal reticulated structure comprising a number of elongated reinforcing elements connecting and extending substantially radially in relation to the beads.

SUMMARY OF THE INVENTION

According to the present invention, there is provided a method of producing a toroidal road vehicle tire carcass comprising two annular beads, and a toroidal reticulated structure connecting the two beads comprising a number of elongated reinforcing elements located between and extending substantially radially in relation to the beads. The method is characterized by the fact that the elongated reinforcing elements are formed using at least one continuous cord wound into a first and a second continuous series of oppositely-oriented U-shaped loops. The loops in the two series are connected in such a manner as to weave a substantially tubular toroidal reticulated structure enclosing the two beads.

The above method preferably comprises an initial stage consisting of forming a supporting frame for the carcass. The frame comprises an inner portion defined by the two beads forming the skeleton of the carcass. A removable auxiliary outer portion is located between and radially outwards in relation to the beads; and the reticulated structure is woven about the two beads and outside the auxiliary outer portion.

According to a preferred embodiment of the above method, the loops in said two series are connected by inserting each loop in each series through a respective loop in the other series. In particular, each loop is preferably formed by inserting an intermediate U-shaped cord portion through a respective loop formed from another intermediate cord portion, so as to form a link between said two loops and produce a "boucle" or looped type reticulated structure.

The present invention also relates to a carcass formed using the above method.

According to the present invention, there is provided a toroidal road vehicle tire carcass comprising two annular beads, and a reticulated structure connecting the two beads comprising a number of reinforcing elements extending between and substantially radially in relation to the beads; characterized by the fact that the elongated reinforcing elements are formed from at least one continuous cord wound into a first and a second continuous series of oppositely-oriented U-shaped loops, each connected to a respective loop in the other series to weave a substantially tubular toroidal reticulated structure enclosing the two beads.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
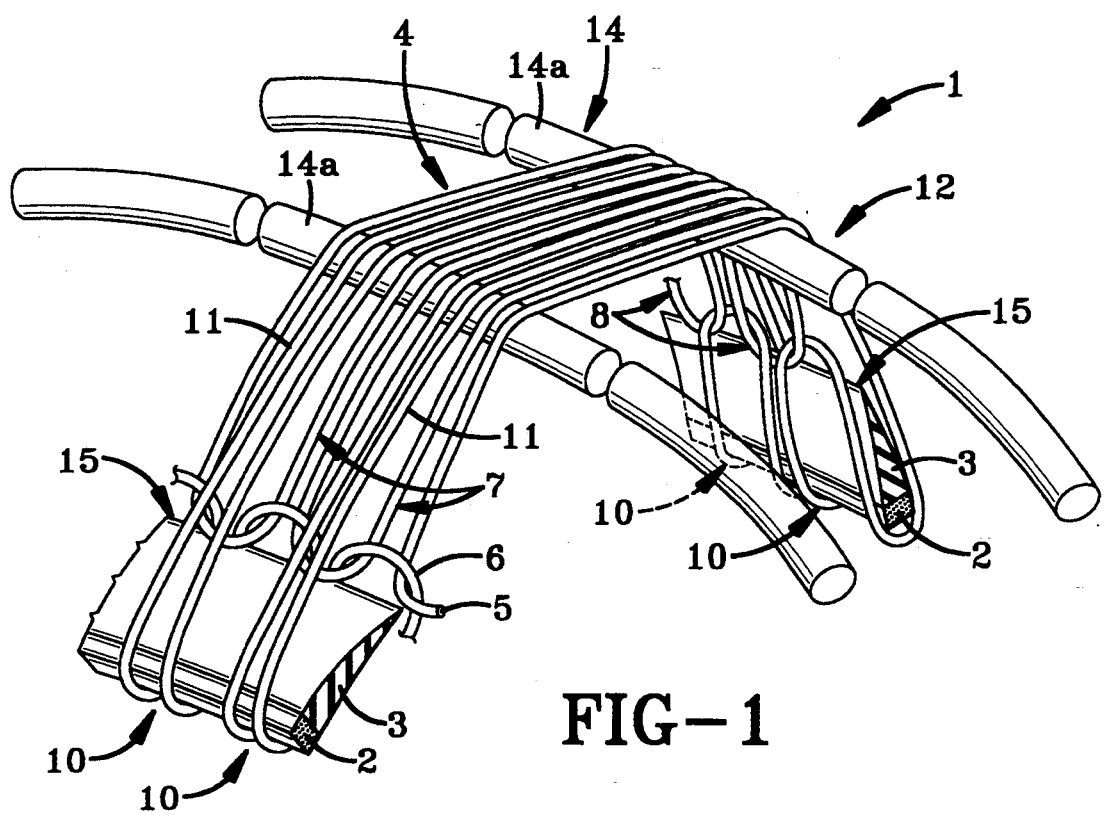
FIG. 1 shows a schematic view in perspective of a portion of a preferred embodiment of the carcass according to the present invention.
Figure 2:
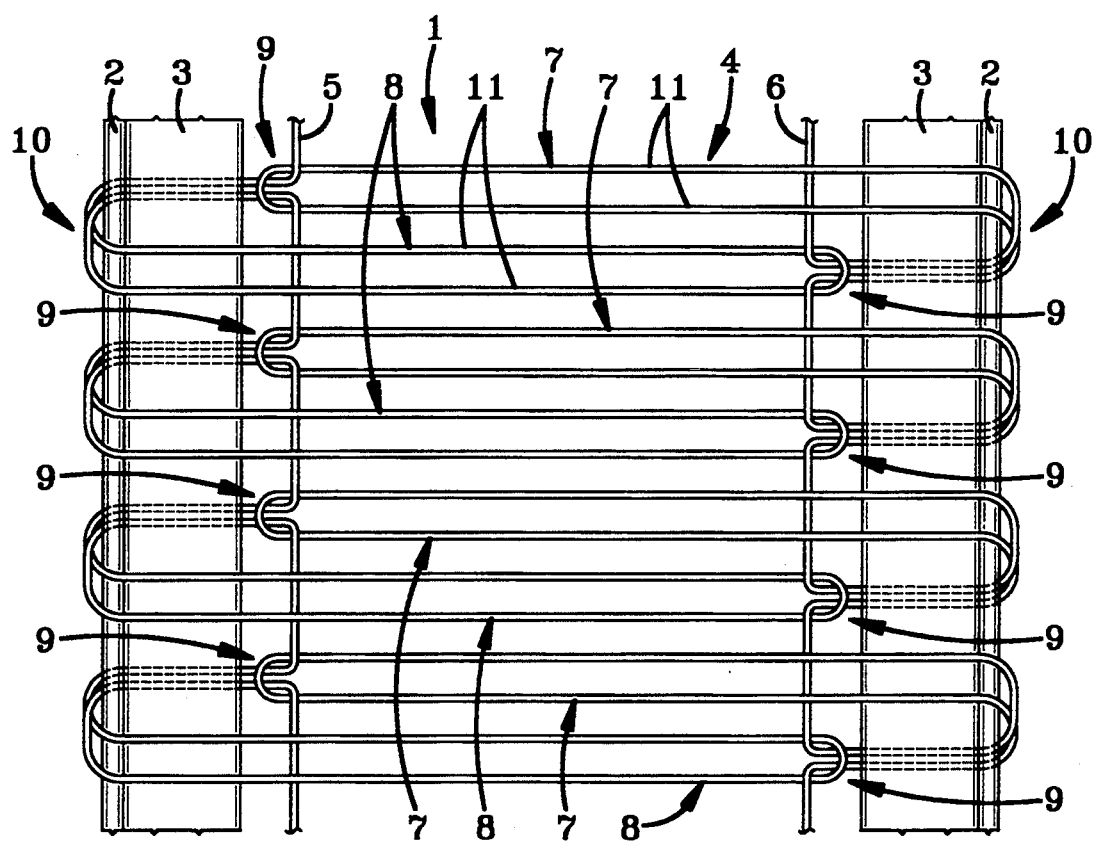
FIG. 2 shows a plan view of the carcass portion of FIG. 1.

Number 1 in FIG. 1 indicates a toroidal road vehicle tire carcass. Carcass 1 comprises two annular beads 2 with respective bead fillers 3; and a toroidal reticulated structure 4 connecting beads 2. Structure 4 comprises a number of reinforcing elements extending between and substantially radially, in relation to beads 2.

In the example shown, the reinforcing elements are formed from a first and a second continuous cord 5 and 6 respectively, wound so as to form a first and a second continuous series of oppositely-oriented U-shaped loops 7 and 8, respectively.

According to a variation not shown, cords 5 and 6 are connected to form a single continuous cord. Alternatively, according to further variations not shown, the carcass may be divided into a number of sectors, each formed using one or two cords.

Each loop 7 and 8 is linked at 9 to a respective loop 8 and 7 in the other series, to weave a substantially tubular structure 4 enclosing beads 2. Each link 9 in loops 7 and 8, is located along the inner surface of reticulated structure 4, close to a respective bead 2, and is formed by inserting one of the loops 7 and 8 through the other loop 8 and 7, so as to form a so-called "boucle" structure 4.

Each loop 7 and 8 comprises a first portion 10 extending from link 9 about adjacent bead 2 having two substantially parallel branches; and a second U-shaped end portion 11 wound towards the other bead 2.

Carcass 1 as described above, is formed on a supporting frame 12. Frame 12 comprises an inner portion 13 defined by beads 2 which forms the skeleton of carcass 1. A removable auxiliary outer portion 14 defined by two rings 14a, each consists of a number of curved segments connected in a releasable manner (not shown). Portion 14 is located between and radially outwards in relation to beads 2, so as to define, with beads 2, two annular openings 15.

During the formation of structure 4, frame 12 is preferably rotated about its axis, and structure 4 is woven about beads 2 and outside portion 14. In particular, as already stated, links 9 are arranged along the inner surface of structure 4. The first portion 10 of each loop 7 and 8 extends from a respective link 9 and is wound outwards about a respective adjacent first bead 2. Second portion 11 is wound towards the second bead 2, outside portion 14, and through the opening 15 adjacent to second bead 2, up to a further link 9 adjacent to second bead 2.

Each of loops 7 and 8 is therefore wound about a respective bead 2, and extends over the outside of frame 12 and through opening 15 opposite respective bead 2 in relation to portion 14, so as to produce a woven tubular structure 4 enclosing beads 2.

In connection with the above, it should be pointed out that, as with any boucle structure, each loop 7 and 8 is produced by winding an intermediate portion of a cord into a U. In other words, structure 4 may be produced using one cord 5 or 6, with one free end, and by winding a first intermediate portion of said cord 5 or 6 into a U to produce a first loop 7 or 8, and then winding further intermediate portions of cord 5 or 6 into further loops 7 or 8, on the opposite side of said first intermediate portion in relation to said free end. That is, structure 4 may be produced from a so-called "infinite" cord 5 or 6, e.g. a cord 5 or 6 produced continuously, as it is used up, by a die (not shown) adjacent to frame 12.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A toroidal road vehicle tire carcass comprising two annular beads, and a substantially tubular reticulated structure connecting the two beads; said structure comprising a number of elongated reinforcing elements extending between and substantially radially in relation to the beads; each of said elongated reinforcing elements being formed from at least one continuous cord wound into a first and a second continuous series of oppositely-oriented U-shaped loops, each loop in each series being inserted through an intermediate portion of each respective loop in the other series to weave said tubular toroidal reticulated structure enclosing the two beads; each intermediate U-shaped portion of one of the loops extending through the other of said loops forming a link between said two loops; said link being one of a series of links extending along and adjacent to each of said beads, with said intermediate portions extending between said links being substantially parallel.

2. A carcass as claimed in claim 1, in which said elongated reinforcing elements are formed from at least two continuous cords, each wound into a respective one of said continuous series of loops.

3. A carcass as claimed in claim 1, in which each of said links is located along the inner surface of said reticulated structure.

4. A method of producing a toroidal road vehicle tire carcass comprising two annular beads, and a substantially tubular toroidal reticulated structure connecting the two beads comprising a number of elongated reinforcing elements located between and extending substantially radially in relation to the beads; said method comprising the steps of forming said elongated reinforcing elements by winding at least one continuous cord into a first and a second continuous series of oppositely oriented U-shaped loops such that each oppositely oriented U-shaped loop includes an intermediate U-shaped portion, a first end and a second end; weaving the loops in said two series in such a manner as to form said substantially tubular toroidal reticulated structure by inserting both the first and second ends of each U-shaped loop in each series through a respective intermediate portion of a respective loop in the other series so as to form a link between said two loops and produce a looped reticulated structure having a series of such links extending along and adjacent to each of said beads and simultaneously enclosing the two beads, with said intermediate portions extending between said links being substantially parallel.

5. A method as claimed in claim 1, in which two continuous cords are employed; each of said continuous series of loops being produced by winding a respective one of said continuous cords.

6. A method as claimed in claim 1, in which the method comprises an initial step including forming a frame supporting said carcass; said frame comprising an inner portion defined by the two beads, and a removable auxiliary outer portion located between and radially outwards in relation to the beads; weaving said reticulated structure about the two beads and outside said auxiliary outer portion such that the entire intermediate portion is positioned radially outwardly of said auxiliary outer portion.

7. A method as claimed in claim 5, in which each of said links is formed inside said frame.

8. A method as claimed in claim 6, in which each of said links is formed adjacent a respective one of said beads.

9. A method as claimed in claim 6, in which said inner and outer portions define two annular openings; each of said loops comprising a first and a second portion; said first portion comprising two substantially parallel branches, wound as one of said loops in the other series, outwards about one of said beads and outside one of said openings; said second portion being a U-shaped end portion, which is wound towards the other of said beads and through the other of said openings.

* * * * *